US006865162B1

(12) United States Patent
Clemm

(10) Patent No.: US 6,865,162 B1
(45) Date of Patent: Mar. 8, 2005

(54) ELIMINATION OF CLIPPING ASSOCIATED WITH VAD-DIRECTED SILENCE SUPPRESSION

(75) Inventor: Alexander Clemm, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 691 days.

(21) Appl. No.: 09/732,104

(22) Filed: Dec. 6, 2000

(51) Int. Cl.$^{7}$ .................................................. H04B 3/20

(52) U.S. Cl. ........................................ 370/286; 370/486

(58) Field of Search ................................ 370/286, 253, 370/353, 371, 516, 406; 704/201; 379/52, 406.03

(56) References Cited

U.S. PATENT DOCUMENTS

| | | | | | |
|---|---|---|---|---|---|
| 5,974,374 | A | | 10/1999 | Wake | |
| 6,049,765 | A | * | 4/2000 | Iyengar et al. | 704/201 |
| 6,199,036 | B1 | | 3/2001 | Ahmadi | |
| 6,498,791 | B2 | | 12/2002 | Pickett et al. | |
| 6,510,224 | B1 | * | 1/2003 | Christensson et al. | 379/406.03 |
| 6,519,259 | B1 | | 2/2003 | Baker et al. | |
| 6,522,746 | B1 | | 2/2003 | Marchok et al. | |
| 6,526,139 | B1 | | 2/2003 | Rousell et al. | |
| 6,526,140 | B1 | | 2/2003 | Marchok et al. | |
| 6,567,503 | B2 | * | 5/2003 | Engelke et al. | 379/52 |
| 6,584,108 | B1 | | 6/2003 | Chung et al. | |
| 6,600,720 | B1 | | 7/2003 | Gvozdanovic | |
| 6,611,531 | B1 | | 8/2003 | Chen et al. | |
| 6,614,781 | B1 | | 9/2003 | Elliott et al. | |
| 6,621,812 | B1 | | 9/2003 | Chapman et al. | |
| 6,621,833 | B1 | | 9/2003 | Pierson, Jr. | |
| 6,650,652 | B1 | | 11/2003 | Valencia | |
| 6,654,376 | B1 | | 11/2003 | Stacey et al. | |
| 6,665,317 | B1 | * | 12/2003 | Scott | 370/516 |
| 6,683,889 | B1 | * | 1/2004 | Shaffer et al. | 370/516 |
| 6,747,977 | B1 | | 6/2004 | Smith et al. | |
| 6,760,420 | B2 | | 7/2004 | Heilmann et al. | |
| 6,763,017 | B1 | | 7/2004 | Buckingham et al. | |
| 6,765,931 | B1 | | 7/2004 | Rabenko et al. | |
| 2001/0014857 | A1 | | 8/2001 | Wang | |
| 2001/0033583 | A1 | | 10/2001 | Rabenk et al. | |
| 2002/0021711 | A1 | | 2/2002 | Gummalla et al. | |
| 2002/0064169 | A1 | | 5/2002 | Gummalla et al. | |
| 2002/0110152 | A1 | | 8/2002 | Schaffer | |
| 2002/0119821 | A1 | | 8/2002 | Sen et al. | |
| 2002/0154641 | A1 | | 10/2002 | McGowan | |
| 2002/0154764 | A1 | | 10/2002 | Ahmad | |
| 2002/0165711 | A1 | | 11/2002 | Boland | |
| 2003/0206625 | A9 | | 11/2003 | Ahmad | |
| 2004/0120318 | A1 | | 6/2004 | Clemm | |

OTHER PUBLICATIONS

"Packet Telephony: Long Distance Service for ISP's" pp1–16, (1999) Cisco Systems , Inc.*

* cited by examiner

*Primary Examiner*—Salvatore Cangialosi
(74) *Attorney, Agent, or Firm*—Blakely, Sokoloff, Taylor & Zafman LLP

(57) ABSTRACT

A method and apparatus for elimination of clipping associated with VAD-directed silence suppression includes receiving a voice signal in a buffer during the delay between the start of voice activity and the detection of the voice activity. Then, the voice signal is played from the buffer in condensed form, e.g., by dropping packets or slightly accelerating playback of the signal from the buffer. After voice activity is detected, the voice signal may continue to be buffered and condensed until the buffer is completely depleted. The voice signal may then be transmitted directly, without being buffered or condensed.

40 Claims, 4 Drawing Sheets

ELIMINATION OF CLIPPING ASSOCIATED WITH VAD-DIRECTED SILENCE SUPPRESSION

FIELD OF INVENTION

The present invention relates generally to digital signal processing (DSP) in Voice over Packet (VoP) networks.

BACKGROUND OF THE INVENTION

A high percentage of a conversation between two or more people is silence, during which no voice activity takes place. In telephone networks providing voice services, any transmission of voice payload for these periods of silence constitutes a waste of bandwidth. Telecommunications service providers have recognized this and generally strive to apply silence suppression in the case when no voice activity is taking place as a way to realize bandwidth savings for service providers of voice networks. When silence suppression is applied in networks transmitting voice over packets (e.g., voice over internet protocol (VoIP) networks, or voice over asynchronous transfer mode (VoATM) networks), no packets are transmitted during periods of silence. The associated feature is often simply called VAD (Voice Activity Detection and directed silence suppression), and is used to determine whether or not to transmit packets, i.e. suppress silence. Often the feature is referred to simply as VAD, which is somewhat of a simplification of terms, as VAD is used to dynamically control, i.e. turn on and off, silence suppression.

Generally, VAD kicks in only after a certain integration period during which no voice activity takes place, typically 250 ms. This allows the system to distinguish real periods of voice inactivity from mere temporary drops in the wave pattern generated by speech. Likewise, when voice activity resumes after a period of silence, a certain period of time is required to determine that voice activity is resuming (as opposed to, e.g., a spike caused by static) only after which silence suppression is again turned off.

This leads to the problem of clipping, i.e., the problem that the initial period of voice activity before silence suppression is turned off, perhaps a few tens of milliseconds, is not transmitted and lost. Although the loss is only brief, the result is a noticeable degradation of quality of voice service to the end users, as e.g. the initial syllable of a word is cut off after each period of brief voice inactivity, as observed on VISM. The result is that some customers may ask their voice service providers to turn VAD off, which prohibits the service providers from realizing the substantial bandwidth savings associated with VAD.

Another conventional solution is to buffer the voice signals. An incoming voice signal is forwarded into a buffer. After detection of voice activity, the buffer starts to be played out. This way, no voice activity is lost, with the buffer buffering the period of time necessary to turn off silence suppression after voice activity initially occurs. However, this solution introduces a significant delay in voice transmission, which in itself constitutes another degradation of quality of voice service severe enough to be generally unacceptable.

SUMMARY OF THE INVENTION

A method and apparatus for elimination of clipping associated with VAD-directed silence suppression are disclosed. In one embodiment, the method includes receiving a voice signal in a buffer, ending silence suppression, and condensing the voice signal.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and apparatus for elimination of clipping associated with VAD-directed silence suppression are disclosed. In one embodiment, the method and apparatus enable VAD functionality to be maintained while at the same time eliminating, or greatly reducing, the effects of clipping. This allows voice network service providers to realize the bandwidth savings associated with VAD silence suppression with minimum degradation in the perceived quality of voice service.

In one embodiment, the method and apparatus for elimination of clipping associated with VAD-directed silence suppression includes receiving a voice signal in a buffer during the delay between the start of voice activity and the detection of the voice activity. Then, the voice signal is played from the buffer in condensed form, e.g., by dropping packets or slightly accelerating playback of the signal from the buffer. After voice activity is detected, the voice signal may continue to be buffered and condensed until the buffer is completely depleted. The voice signal may then be transmitted directly, without being buffered or condensed.

The amount of voice buffered corresponds to the length of the delay between the start of voice activity and the detection of voice activity. The incoming signal is buffered during periods in which silence suppression is turned on (i.e. continuously). When voice activity is detected and playout starts, the buffer contains the signal that has been received during the delay between which voice activity actually started and when it was detected.

Figure 1:
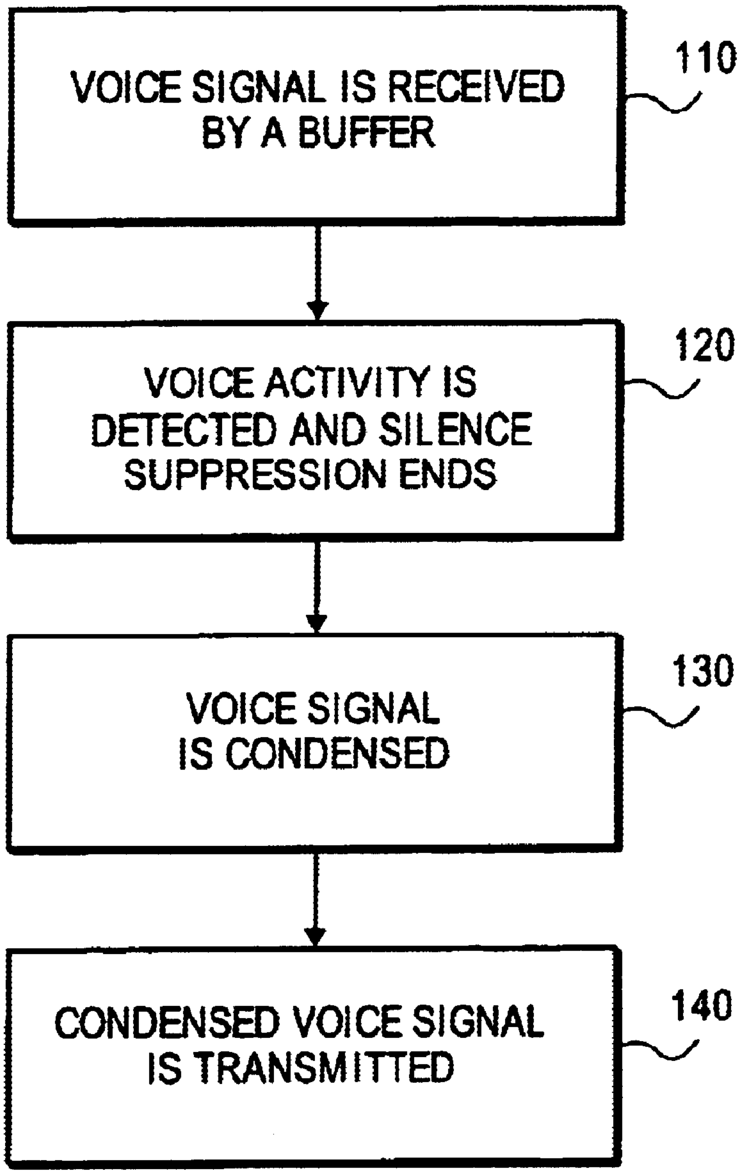
FIG. 1 shows a method for elimination of clipping associated with VAD-directed silence suppression.

FIG. 1 shows a method for elimination of clipping associated with VAD-directed silence suppression. A voice signal is received by a buffer, 110. Voice activity is detected by the VAD, and the VAD ends silence suppression, 120. The voice signal is condensed, 130. The condensed voice signal is transmitted, 140. The voice signal may be condensed by reading the voice signal from the buffer faster than the voice signal is received by the buffer. Alternatively, the voice signal may be condensed by compressing the inter-sound space of the voice signal. Alternatively, because the voice signal is received in the buffer as packets, the voice signal may be condensed by dropping, or removing, packets from the voice signal.

Figure 2:
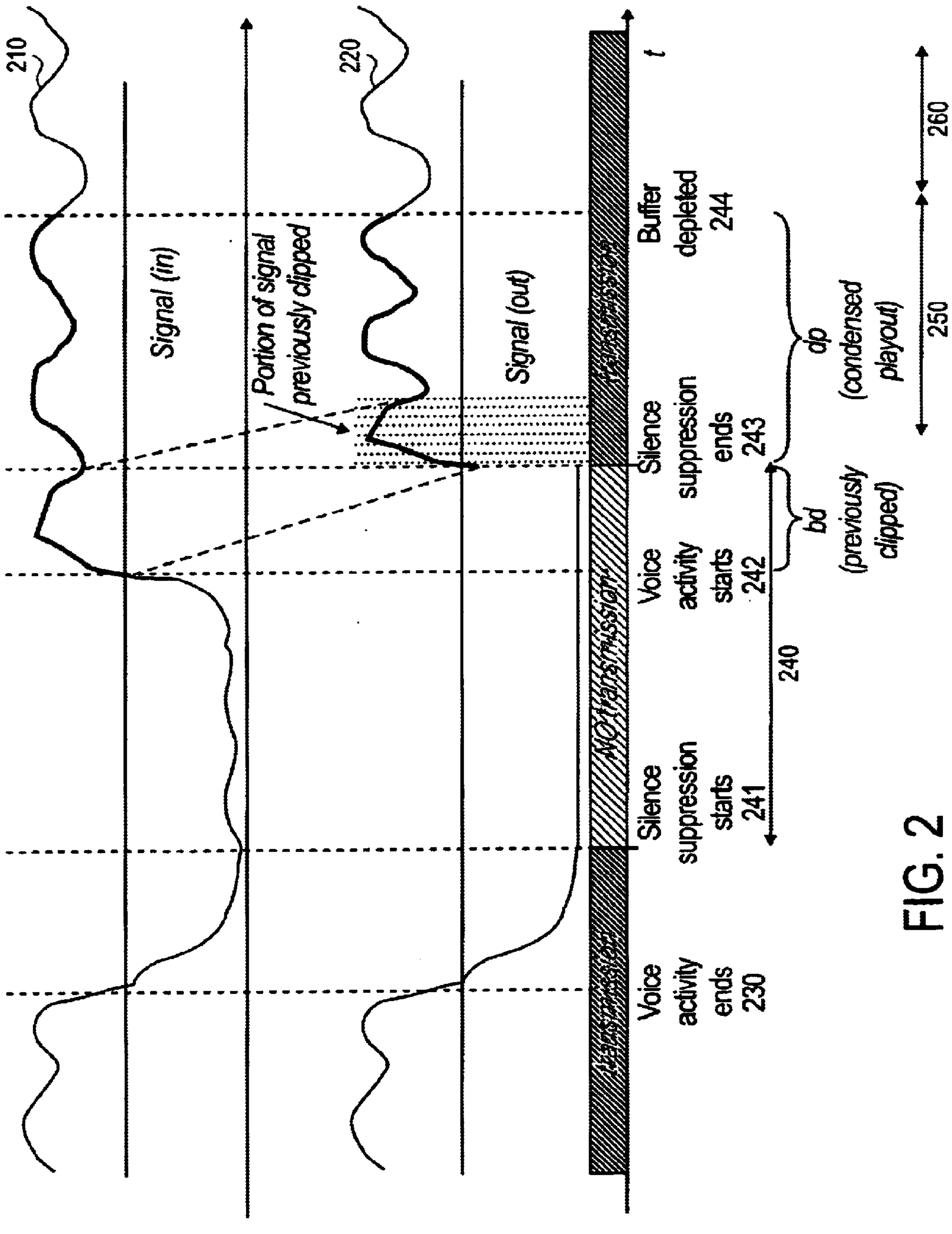
FIG. 2 shows an example of a voice signal that is buffered and transmitted using the method for elimination of clipping associated with VAD-directed silence suppression.

The method for elimination of clipping associated with VAD-directed silence suppression includes introduction of a voice buffer, which may be applied at the transmitting end of a voice connection which is also applying VAD. FIG. 2 shows an example of a voice signal that is buffered and transmitted using the method for elimination of clipping associated with VAD-directed silence suppression. Signal 210 is the voice signal, and signal 220 is the voice signal that is buffered and transmitted. Period 230 is the time when voice activity ends. Period 240 is the period of silence suppression, which begins at time 241. Voice activity begins at time 242, and silence suppression ends at time 243. Time 244 is the time when the voice signal is completely depleted from the buffer. Period 250 is the period when the voice signal is condensed and played out of the buffer.

The voice signal is received by the buffer during the period of silence suppression, including the period after voice activity is detected, and continues until the voice signal is depleted from the buffer. The buffer buffers the amount of time necessary to turn off silence suppression after voice activity initially occurs. When silence suppression is turned off, the voice signal is played out of the buffer at increased speed, as shown by period 250, which shows that the temporal length of condensed voice signal 220 is less than the corresponding temporal length of the original voice signal 210. During period 250, the incoming voice signal is still buffered. After period 250, the buffer is depleted (as it plays out faster than it is filled) and the voice signal 220 is transmitted without being buffered or condensed, as shown in period 260.

This method eliminates clipping. This method also does not introduce a delay except for very brief periods of time immediately after silence suppression is turned off. Thus, this method may not be noticed by a user. For the period of time 250 during which the buffer is depleted, the voice pitch may be slightly higher than normal. But compared to clipping, this should be acceptable; playback of voice messages at increased speed is already a well-accepted feature of voice mail systems, plus the period of time is very short, and is therefore hardly noticeable.

Figure 3B:
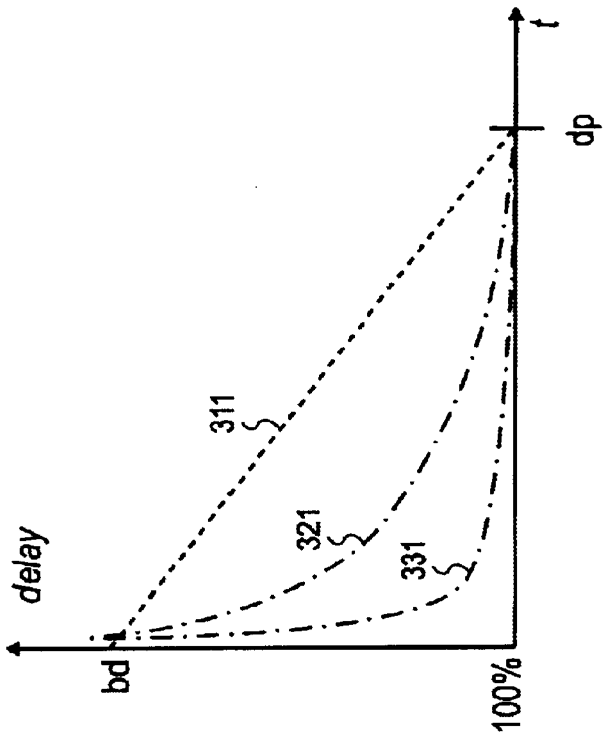
FIG. 3B shows the associated remaining delay caused by the depletion level of the buffer.
Figure 3A:
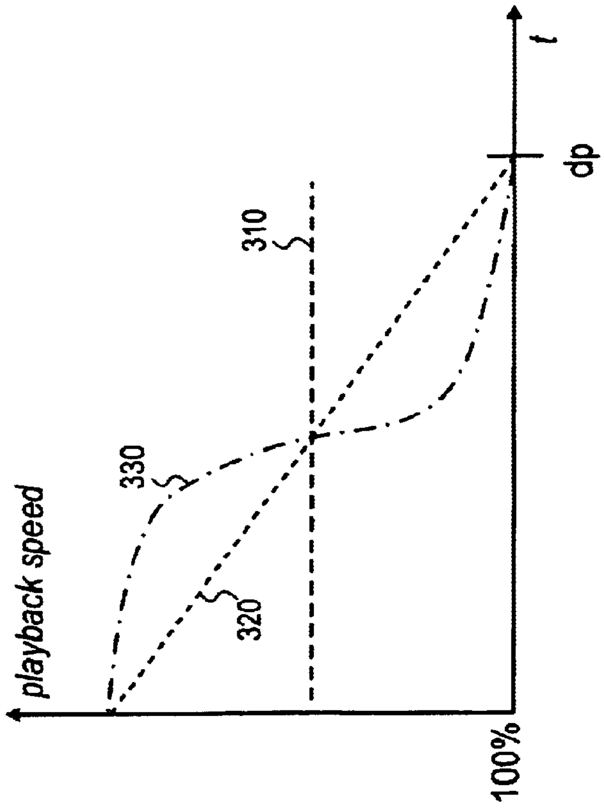
FIG. 3A shows different possible functions for the playback speed of the signal from the buffer.

Furthermore, to reduce the higher voice pitch, the speed of playback can be a time dependent function, gradually slowing until the buffer is depleted. For example, a linear function 320 could be chosen that started at 150% speed playback slowing to 100% speed playback, as shown in FIGS. 3A and 3B. FIG. 3A shows different possible functions for the playback speed of the signal from the buffer, and FIG. 3B shows the associated remaining delay caused by the depletion level of the buffer. For example, a linear function 310 has a corresponding linear delay 311. A decreasing speed function 320 has corresponding delay 321. A nonlinear decreasing speed function 330 has a corresponding nonlinear delay 331.

As an alternative to speeding up playback, playback can also occur at normal speed while compressing inter-sound space, which can cause the voice perception to be more natural and simply appear slightly more hurried. In that case, the buffer depletion period will be variable and depend on the amount of inter-sound space. A third alternative is to drop packets during the condensed playout period.

The different parameters of the method for elimination of clipping associated with VAD-directed silence suppression can be fixed as default values or may be configurable. For example, the parameter bd is the delay of the buffer. This parameter should equal $t_{silence\text{-}suppression\text{-}ends} - t_{voice\text{-}activity\text{-}starts}$, i.e. the amount of time it takes to turn off silence suppression after voice activity initially occurs. A default value may be 75 ms for example.

The parameter dp is the buffer depletion period. The shorter the buffer depletion period, the higher the speed with which the playout has to occur and the quicker the delay introduced by the buffer is reduced to 0. Thus, the value chosen for this parameter involves a tradeoff between the quality of the condensed voice versus the time delay from buffering. One possible default would be to choose e.g. 4*bd, e.g. 300 ms. Note that during those 300 ms (dp), 375 ms worth of voice have to be played out (bd+db), i.e. in this example, playout may occur at (average) 125% speed. Note also that the conventional approaches of either dipping or constant delay corresponds to the choice of a degenerated dp parameter: A choice of dp=0 yields a VAD clipping scheme, whereas a choice of dp=infinity yields a scheme with a constant buffer delay.

Figure 4:
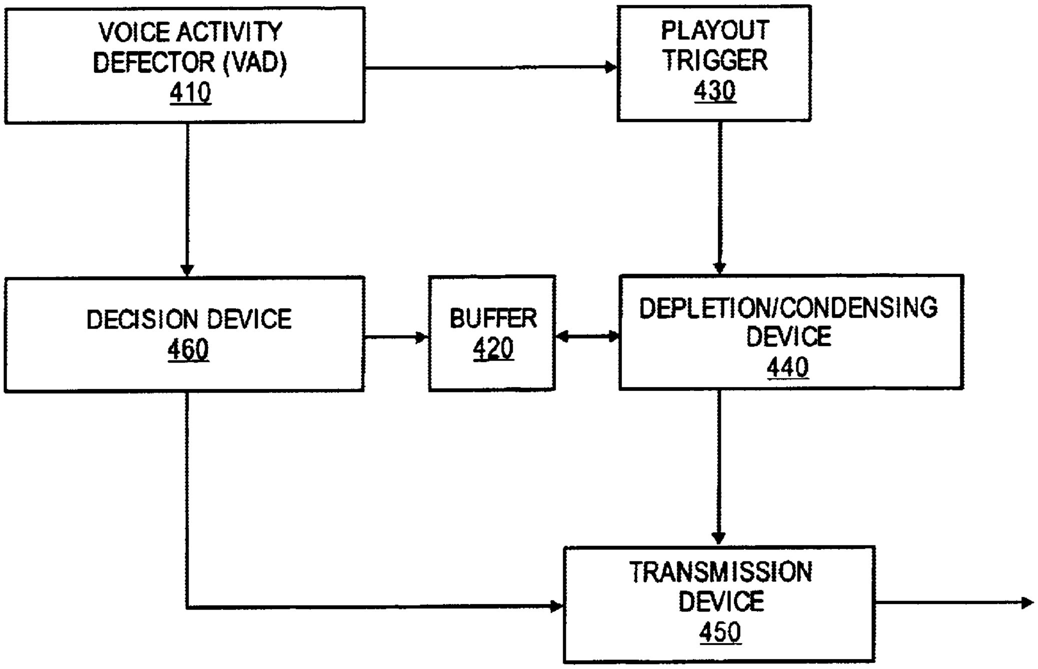
FIG. 4 shows an apparatus for elimination of clipping associated with VAD-directed silence suppression.

FIG. 4 shows an apparatus for elimination of dipping associated with VAD-directed silence suppression. The apparatus may be a part of a DSP. The apparatus may also be a computer program stored in a computer readable medium and executed by a computer processing system. The apparatus may also be implemented as an integrated circuit. As shown in FIG. 4, a voice activity detector 410 detects an incoming voice signal. The incoming voice signal is received into the voice buffering queue 420 if currently VAD 410 has implemented silence suppression (i.e., silence suppression is on). The function of the buffer 420 is to queue all voice traffic for the period of the buffer delay. If silence suppression is not turned off during this period, the voice data is discarded after the buffer delay, i.e. when the buffer is full. The buffer queue may function according to a first in, first out scheme.

When voice activity does get detected, silence suppression is turned off, and VAD 410 activates playout trigger 430, which triggers depletion of the buffer through a depletion/condensing device 440, which condenses the voice signal and depletes the voice signal from the buffer 420. Device 440 passes the "accelerated" traffic on to the transmission device 450 (and application of codes etc.) While the buffer is being depleted, new voice traffic still enters the buffer queue until depletion is complete. When the buffer 420 is depleted, and silence suppression is off, switching device routes new voice traffic directly to transmission device 450, so that the voice traffic bypasses the buffer 420 and depletion device 440.

An advantage of the apparatus for elimination of clipping associated with VAD-directed silence suppression is the combination of a buffer and depletion device. The buffer intercepts incoming voice traffic in periods when VAD has kicked in. The depletion device flushes the buffer in an accelerated manner when the VAD function is released.

Another feature of the method and apparatus is avoidance of the clipping problem with minimum tradeoff on other quality of service parameters, minimizing overall impact on quality of service while allowing service providers to realize bandwidth savings associated with VAD. As opposed to the alternative of turning off VAD, which happens when clipping is deemed unacceptable with existing solutions, the method and apparatus disclosed herein realize the benefits associated with VAD, i.e. saving of bandwidth, which is particularly relevant for bandwidth starved applications e.g. at the edge of the network. As opposed to the alternative of simply buffering, the method and apparatus disclosed herein allow avoidance or reduction of the problems caused by the addition of a constant end-to-end delay, which include permanently degraded quality of voice service.

These and other embodiments of the present invention may be realized in accordance with these teachings and it should be evident that various modifications and changes may be made in these teachings without departing from the broader spirit and scope of the invention. The specification and drawings are, accordingly, to be regarded in an illustrative rather than restrictive sense and the invention measured only in terms of the claims.

What is claimed is:

1. A method comprising:

receiving a voice signal in a buffer;

ending silence suppression; and condensing the voice signal.

2. The method of claim 1, wherein condensing further comprises:

reading the voice signal from the buffer faster than a speed that the voice signal is received in the buffer.

3. The method of claim 1, wherein condensing further comprises:

compressing inter-sound space of the voice signal.

4. The method of claim 1, wherein condensing further comprises:

dropping packets from the voice signal.

5. The method of claim 1, further comprising:

transmitting the condensed voice signal.

6. An apparatus comprising:

means for receiving a voice signal in a buffer;

means for ending silence suppression; and means for condensing the voice signal.

7. The apparatus of claim 6, wherein said means for condensing further comprises:

means for reading the voice signal from the buffer faster than a speed that the voice signal is received in the buffer.

8. The apparatus of claim 6, wherein said means for condensing further comprises:

means for compressing inter-sound space of the voice signal.

9. The apparatus of claim 6, wherein said means for condensing further comprises:

means for dropping packets from the voice signal.

10. The apparatus of claim 6, further comprising:

means for transmitting the condensed voice signal.

11. A computer readable medium having instructions, which, when executed by a processing system, cause the system to:

receive a voice signal in a buffer;

end silence suppression; and condense the voice signal.

12. The medium of claim 11, wherein the executed instructions cause the system to condense by:

reading the voice signal from the buffer faster than a speed that the voice signal is received in the buffer.

13. The medium of claim 11, wherein the executed instructions cause the system to condense by:

compressing inter-sound space of the voice signal.

14. The medium of claim 11, wherein the executed instructions cause the system to condense by:

dropping packets from the voice signal.

15. The medium of claim 11, further comprising instructions, which, when executed, cause the system to:

transmit the condensed voice signal.

16. An apparatus comprising:

a buffer to receive and store a voice signal;

a voice activity detector to detect voice activity and to output a voice activity detection signal; and a condensing device to read the voice signal from the buffer and to output a condensed voice signal in response to the voice activity detection signal.

17. The apparatus of claim 16, wherein the condensing device condenses the voice signal by reading the voice signal from the buffer faster than a speed that the voice signal is received by the buffer.

18. The apparatus of claim 16, wherein the condensing device condenses the voice signal by compressing inter-sound space of the voice signal.

19. The apparatus of claim 16, wherein the condensing device condenses the voice signal by dropping at least one packet from the voice signal.

20. The apparatus of claim 16, further comprising:

a transmission device to transmit the condensed voice signal.

21. A method comprising:

suppressing silence in a voice signal for a time period, the voice signal having a first temporal length;

detecting voice activity in the voice signal during the time period of silence suppression;

buffering the voice signal during a buffer delay period approximately between a first time when the voice activity is detected and a second time when the silence suppression ends; and condensing the voice signal to have a second temporal length less than the first temporal length.

22. The method of claim 21, further comprising communicating the condensed voice signal to a transmission device in response to detecting the voice activity.

23. The method of claim 22, further comprising ending the time period of silence suppression after the condensed voice signal is communicated to the transmission device.

24. The method of claim 22, further comprising transmitting the condensed voice signal.

25. The method of claim 21, further comprising buffering the voice signal continuously during the time period of silence suppression.

26. The method of claim 21, wherein buffering the voice signal occurs at a buffering speed and wherein condensing the voice signal comprises depleting the voice signal from a buffer over a buffer depletion period at a playback speed that is faster on average than the buffering speed.

27. The method of claim 26, wherein the playback speed is variable over the buffer depletion period.

28. The method of claim 27, wherein the playback speed is determined according to a decreasing speed function, wherein the playback speed is faster at the beginning of the buffer depletion period and approximately the same as the buffering speed at the end of the buffer depletion period.

29. The method of claim 21, wherein condensing the voice signal comprises compressing an inter-sound space of the voice signal.

30. The method of claim 21, wherein condensing the voice signal comprises dropping a packet from the voice signal.

31. A computer readable medium having instructions, which, when executed by a processing system, cause the system to:

suppress silence in a voice signal for a time period, the voice signal having a first temporal length;

detect voice activity in the voice signal during the time period of silence suppression;

buffer the voice signal during a buffer delay period approximately between a first time when the voice activity is detected and a second time when the silence suppression ends; and condense the voice signal to have a temporal length less than the first temporal length.

32. The computer readable medium of claim 31, further comprising instructions to cause the system to communicate the condensed voice signal to a transmission device in response to detecting the voice activity.

33. The computer readable medium of claim 32, further comprising instructions to cause the system to end the time period of silence suppression after the condensed voice signal is communicated to the transmission device.

34. The computer readable medium of claim 32, further comprising instructions to cause the system to transmit the condensed voice signal.

35. The computer readable medium of claim 31, further comprising instructions to cause the system to buffer the voice signal continuously during the time period of silence suppression.

36. The computer readable medium of claim 31, wherein the instructions to cause the system to buffer the voice signal further cause the system to buffer the voice signal at a buffering speed and wherein the instructions to cause the system to condense the voice signal further cause the system to deplete the voice signal from a buffer over a buffer depletion period at a playback speed that is faster on average than the buffering speed.

37. The computer readable medium of claim 36, wherein the playback speed is variable over the buffer depletion period.

38. The computer readable medium of claim 37, wherein palyback speed is determined according to a decreasing speed function, wherein the playback speed is faster at the beginning of the buffer depletion period and approximately the same as the buffering speed at the end of the buffer depletion period.

39. The computer readable medium of claim 31, wherein the instructions to cause the system to condense the voice signal further cause the system to compress an inter-sound space of the voice signal.

40. The computer readable medium of claim 31, wherein the instructions to cause the system to condense the voice signal further cause the system to discard a packet from the voice signal.

* * * * *